(12) United States Patent
Fisher

(10) Patent No.: US 6,318,290 B1
(45) Date of Patent: Nov. 20, 2001

(54) AUTOMATIC BIRD FEEDER AND WATERER

(76) Inventor: Mark A. Fisher, 1509 Simpson Ferry Rd., New Cumberland, PA (US) 17070

(*) Notice: Subject to any disclaimer, the term of this patent is extended or adjusted under 35 U.S.C. 154(b) by 0 days.

(21) Appl. No.: 09/514,300

(22) Filed: Feb. 28, 2000

Related U.S. Application Data

(60) Provisional application No. 60/123,374, filed on Mar. 8, 1999.

(51) Int. Cl.⁷ .................................................. A01K 39/00
(52) U.S. Cl. ........................ 119/51.5; 119/52.3; 119/57.9
(58) Field of Search .................................. 119/51.5, 52.1, 119/52.2, 52.3, 57.8, 57.9, 72

(56) References Cited

U.S. PATENT DOCUMENTS

| | | | |
|---|---|---|---|
| Re. 32,970 | * 7/1989 | Furlani | 119/52.3 |
| 3,720,184 | * 3/1973 | Pearce | 119/51.5 |
| 3,730,141 | * 5/1973 | Manning et al. | 119/51.5 |
| 4,131,083 | 12/1978 | Sokol et al. | |
| 4,441,458 | 4/1984 | Mercil | |
| 4,651,679 | * 3/1987 | Fassauer | 119/51.5 |
| 4,691,665 | 9/1987 | Hefner | |
| 4,735,171 | * 4/1988 | Essex | 119/51.12 |
| 5,086,730 | 2/1992 | Figley | |
| 5,289,796 | * 3/1994 | Armstrong | 119/52.3 |
| 5,309,865 | * 5/1994 | Hardison | 119/57.8 |
| 5,353,742 | * 10/1994 | Mauritz | 119/77 |
| 5,360,138 | * 11/1994 | Zeller | 222/1 |
| 5,410,986 | 5/1995 | Washam | |
| 5,549,075 | 8/1996 | Golden | |
| 5,568,789 | * 10/1996 | Koenig et al. | 119/57.9 |
| 5,845,600 | * 12/1998 | Mendes | 119/51.5 |
| 6,116,189 | * 9/2000 | Rundle | 119/51.5 |
| 6,142,099 | * 11/2000 | Lange, Jr. | 119/51.5 |
| 6,158,385 | * 12/2000 | Boyd | 119/52.3 |

* cited by examiner

Primary Examiner—Charles T. Jordan
Assistant Examiner—Yvonne R. Abbott
(74) Attorney, Agent, or Firm—Richard C. Litman

(57) ABSTRACT

An automatic bird feeder and waterer includes both a food and a water reservoir therein, as well as dispensing areas for food and water supplied from the respective reservoirs. The water reservoir comprises a generally cylindrical container installed concentrically through the generally cylindrical food reservoir. The water outlet or dispensing portion is laterally offset by an upturned elbow, which also serves as the lowermost point of the assembly. The feed dispensers may include partial covers to preclude the feeding of larger non-flying animals (squirrels, etc.) therefrom. The device is supported by a rigid support extending downwardly from the elbow. The support column may be anchored in a massive block (concrete, etc.), which may in turn be placed in a decorative container (flowerpot or the like). The entire assembly may be constructed substantially from prefabricated plumbing or pipe components, particularly those formed from polyvinyl chloride (PVC) plastic material. The use of such PVC material allows either adhesive or mechanical fastening of components to one another during assembly of the device.

20 Claims, 2 Drawing Sheets

AUTOMATIC BIRD FEEDER AND WATERER

REFERENCE TO RELATED PATENT APPLICATION

This application claims the benefit of U. S. Provisional Patent Application Serial No. 60/123,374, filed on Mar. 8, 1999.

BACKGROUND OF THE INVENTION

1. Field of the Invention

The present invention relates generally to apparatus and devices used in the care and feeding of animals, and more specifically to an apparatus for automatically providing food and water for small wild birds (robins, sparrows, finches, etc.) which are commonly found in the vicinity of urban, suburban, and rural homes. The device is constructed of various mating and concentric plumbing and pipe components, and may be constructed substantially of polyvinyl chloride (PVC) materials.

2. Description of the Related Art

Small wild birds, such as finches, sparrows, robins, and the like, are typically found throughout many parts of the nation. The sight and sounds of such birds are enjoyable to many persons, who make an effort to encourage such birds to gather in the vicinity of their homes. However, in many cases, particularly in northern climes, such birds will migrate from the area during significant portions of the year. This is not entirely due to the weather; it is often due to the lack of seed or other food being naturally available during much of the year, in various areas.

Accordingly, many people have encouraged birds to remain in the area, and/or to gather at or near the homes of those persons, by providing food, water, and/or shelter for such birds. Various devices have been developed in the past for such purposes, but most do not provide all of the sustenance which birds typically require. Most such devices of the prior art provide only solid food, without any provision for water for the birds. Of those devices which have been developed for providing liquids to birds, they are generally directed to providing liquid nourishment to hummingbirds, which commonly feed on liquid nectar from plants and are thus adapted to take liquid provided from a container. However, birds requiring solid food cannot utilize such liquid nourishment. In any event, the lack of water provided with conventional bird feeder units, results in the birds needing to travel elsewhere to find water, and thus at least partially defeats the purpose of such a feeder.

Accordingly, a need will be seen for an automatic bird feeder and waterer, which automatically provides both solid food (seed or the like) as well as water for small wild birds and the like. The device must be capable of dispensing both food and water independently, and must be capable of containing a reasonably large supply of both, in order to avoid need for frequent servicing. Finally, the device must also be relatively simple and require little maintenance in its construction and operation.

A discussion of the related art of which the present inventor is aware, and its differences and distinctions from the present invention, is provided below.

U. S. Pat. No. 4,131,083 issued on Dec. 26, 1978 to John J. Sokol et al., titled "Bird Unit," describes a bird feeder and waterer unit having concentric feeder and waterer units. However, the waterer component comprises a wide and relatively shallow dish with an upwardly convex central dome and relatively small upturned rim, with only the relatively small volume of the upturned rim providing for the containment of a relatively small amount of water therein. No other water reservoir is provided, thus requiring the water holding rim to be replenished frequently, particularly in hotter and drier climates. In contrast, the present bird feeder and waterer includes an elongate, central water supply which communicates with a single water outlet. The present invention also automatically replenishes the water supply of the water outlet from the central water supply or reservoir until the relatively large reservoir is depleted, without need for manual intervention.

U. S. Pat. No. 4,441,458 issued on Apr. 10, 1984 to Robert A. Mercil, titled "Bird Feeder Construction," describes a hummingbird feeder providing only liquid nutrients. The improvement is actually separate from the conventional hummingbird feeder, and comprises a liquid container installed concentrically upon the line from which the feeder is suspended. The liquid container precludes ants and other insects from being able to reach the feeder by traveling down the suspension line. No rigid, upstanding support is disclosed by Mercil, nor is any means provided for dispensing both solid food and liquids, as provided by the present invention.

U. S. Pat. No. 4,691,665 issued on Sep. 8, 1987 to Boby R. Hefner, titled "Hummingbird Feeder," describes a feeder tank or reservoir having a basin formed externally in the top of the reservoir. The attachment for the suspension line extends upwardly from the center of the basin. The basin is to be filled with cooking oil or other suitable liquid, thereby precluding the travel of ants or other insects down the suspension line to the feeder outlets. Accordingly, the Hefner device is more closely related to the Mercil hummingbird feeder than to the present automatic bird feeder and waterer, with essentially the same distinctions being noted between the Hefner device and the present invention, as were noted between the Mercil device and the present invention.

U. S. Pat. No. 5,086,730 issued on Feb. 11, 1992 to Robert S. Figley, titled "Bird Feeder," describes a feeder for dispensing solid food (seed, etc.) only; no means of dispensing water is provided by the Figley device. The Figley feeder is suspended from above, rather than being supported rigidly from below, as in the present feeder and waterer invention. Figley provides an inverted conical cover extending from the top attachment to the suspension line, downwardly to shield the feed dish from rodents or other non-flying animals. The rigid lower support provided for the present feeder and waterer, and the provision of both food (seed) and water by the present invention, serve to make it distinct from the Figley device.

U. S. Pat. No. 5,410,986 issued on May 2, 1995 to Larry W. Washam, titled "Bird Feeder Formed Of A Plurality Of Interconnected Tubular Columns," describes a feeder providing only solid food (seed), with no provision for supplying water. The device basically comprises a central hollow tubular support column, which also serves as the seed reservoir for the device. A series of diagonally downward branches extend from the central tube, to provide seed to a corresponding series of generally horizontal, flat platforms. No concentric water supply or water reservoir for an external water supply is disclosed by Washam, which features form parts of the present invention.

Finally, U. S. Pat. No. 5,549,075 issued on Aug. 27, 1996 to James B. Golden, titled "Automatic Bird Feeder," describes a relatively complex device having a base with a solid food reservoir therein and an upper unit comprising the food dispensing portion of the device. Powered means are used to lift food from the lower storage supply, upwardly to the food dispensing unit. An electronic sensor detects a depleted food supply in the dispensing unit, and activates the power means to lift additional food up to the dispensing unit. Golden does not provide any water supply or water dispensing means with his feeder, as provided by the present invention. Moreover, the present invention also automatically resupplies the food dispensing portion of the device, but does so without any requirement for mechanized or powered apparatus.

None of the above inventions and patents, either singly or in combination, is seen to describe the instant invention as claimed.

SUMMARY OF THE INVENTION

The present invention comprises an automatic bird feeder and waterer, containing both a food and a water reservoir or supply for the food and water dispensing portions of the device. The water reservoir is disposed concentrically through the food reservoir and supply, with the entire unit being supported from below by a rigid support column. The apparatus may be constructed substantially of prefabricated plumbing or pipe components, and is most preferably constructed of polyvinyl chloride (PVC) plastic material, which may be adhesively or mechanically secured together. The bottom of the support for the device may be placed in a massive anchor, which may in turn be placed in a decorative container, such as a large flowerpot or other suitable base.

Accordingly, it is a principal object of the invention to provide an improved automatic bird feeder and waterer containing reservoirs for both food and water, as well as dispensing outlets for both food and water.

It is another object of the invention to provide an improved automatic bird feeder and waterer which water reservoir is disposed concentrically through the food reservoir.

It is a further object of the invention to provide an improved automatic bird feeder and waterer which may be constructed substantially of prefabricated plumbing and pipe components, using adhesive or mechanical means for assembly.

Yet another object of the invention is to provide an improved automatic bird feeder and waterer having means for precluding feeding of squirrels and other non-flying animals therefrom.

An additional object of the invention is to provide an improved automatic bird feeder and waterer which prefabricated components thereof, may be formed of polyvinyl chloride or other suitable plastic material.

Still another object of the invention is to provide an improved automatic bird feeder and waterer having rigid support means extending therebelow.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
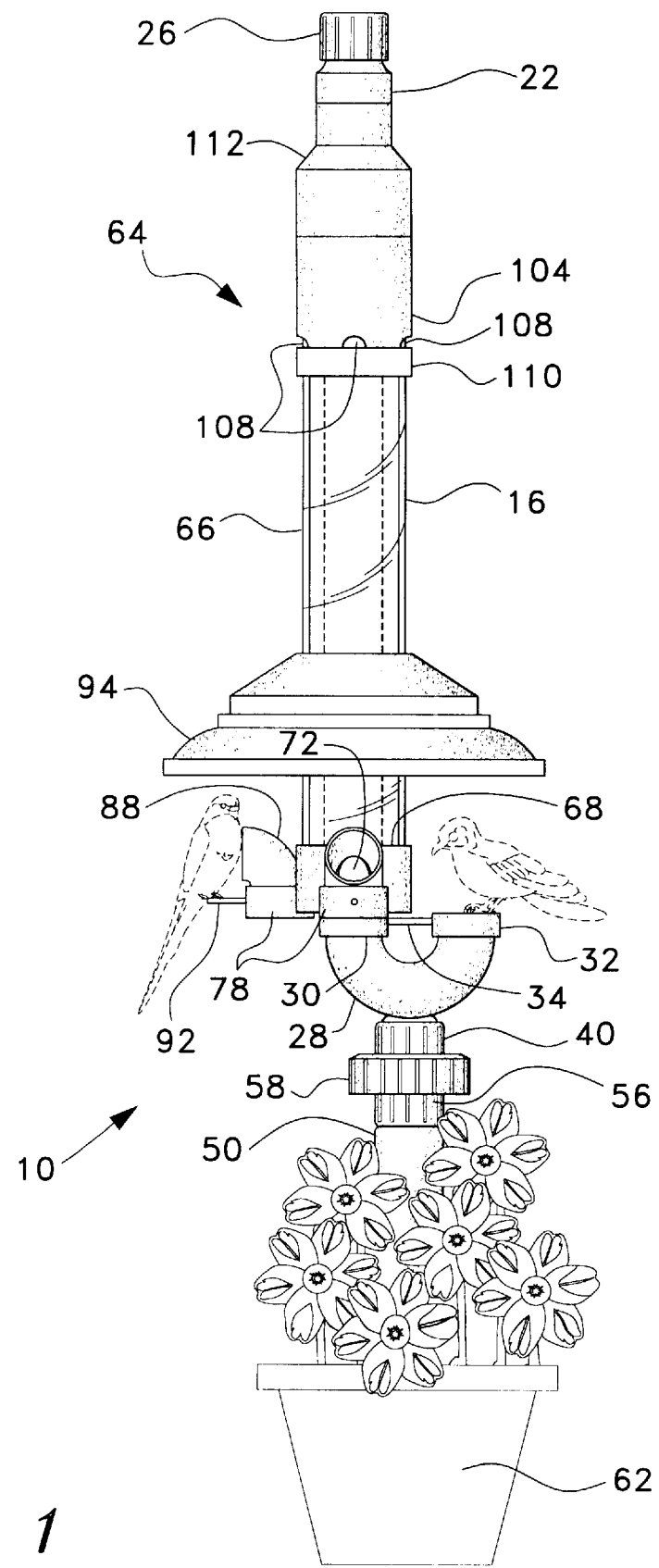
FIG. 1 is a side elevation view of the present automatic bird feeder and waterer, showing its general configuration and function.

The present invention comprises an automatic bird feeder and waterer, indicated generally by the reference numeral 10 in the two drawing Figures. Preferably, the components used in the construction of the present feeder and waterer 10 comprise various prefabricated plumbing or pipe components and materials. Components formed of polyvinyl chloride (PVC) or other plastic material are suitable for construction of the present feeder and waterer. However, other suitable materials may be used as desired. The use of prefabricated PVC plumbing components provides economical and rapid construction, with such components being configured for mating assembly with one another.

Figure 2:
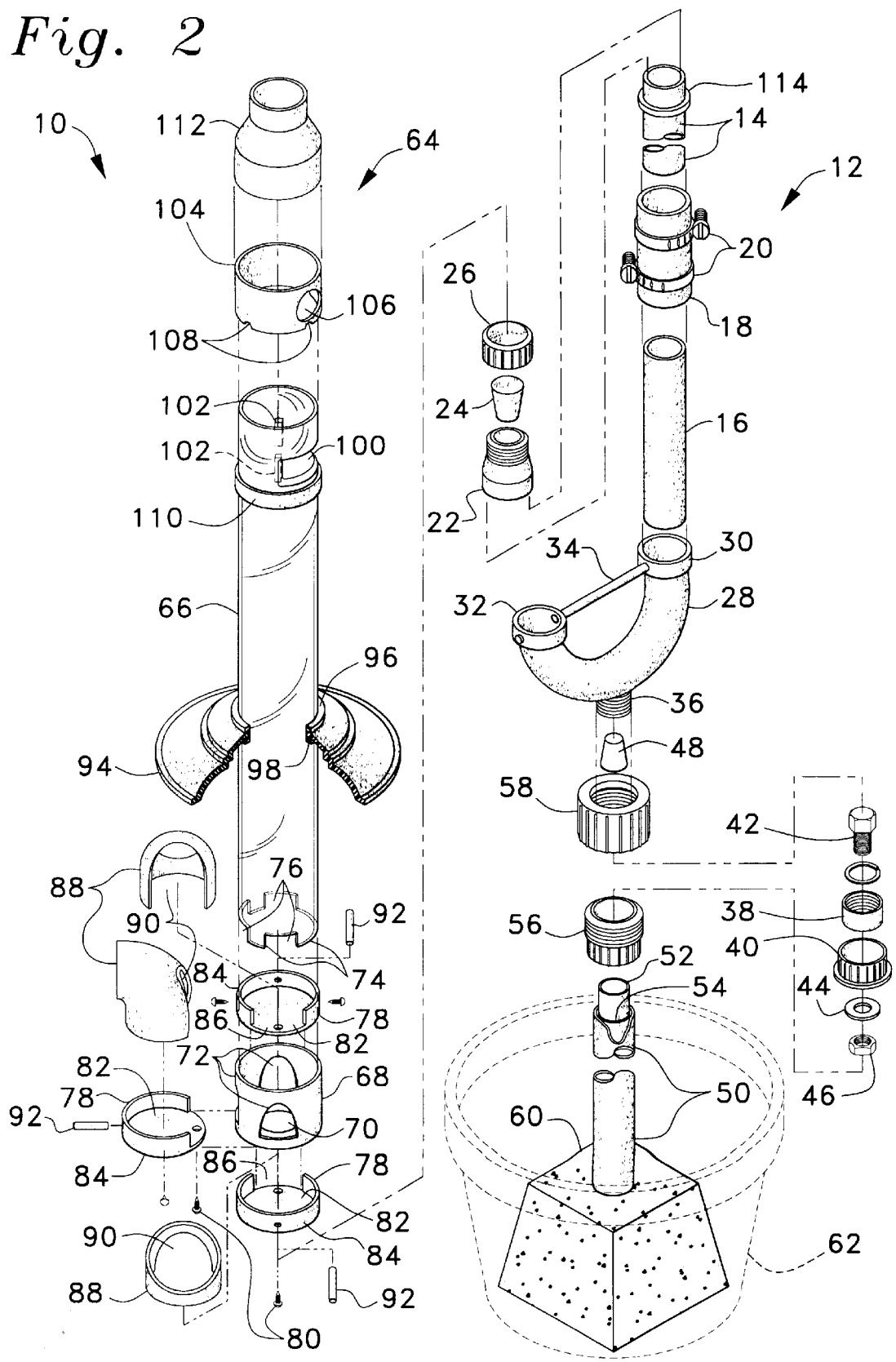
FIG. 2 is an exploded perspective view of the present automatic bird feeder and waterer, showing the various components thereof and their relationships.

FIG. 2 provides an exploded perspective view of the present feeder and waterer 10, showing the various components thereof. An elongate central water reservoir 12 is formed of an upper tubular portion 14 and a lower tubular portion 16 of identical diameter. The water reservoir 12 may be formed of a single length of material, if so desired. However, the use of two separate pieces of material 14 and 16 provides for ease of disassembly of the device for maintenance or repair, if required. A connecting sleeve 18 may be used to join the two components 14 and 16, with clamping means 20 (hose clamps, etc.) being used to secure the connecting sleeve 18 to the two reservoir sections 14 and 16 and to provide an air and liquid tight seal therebetween.

The upper end of the water reservoir 12 has a reducer fitting 22 secured thereto, with the smaller diameter upper end of the fitting 22 accepting sealing means 24 (rubber stopper, etc.) therein. A threaded cap 26 may be applied over the seal 24 and screwed onto the reducer 22, to force the seal 24 securely into the fitting 22 for an air tight seal. Alternatively, some other sealing means may be used, such as an O-ring (not shown) within the cap 26 to seal against the lip of the reducer 22, if so desired.

The opposite lower end of the water reservoir 12 includes a 180 degree elbow or trap component 28 having a first or attachment end 30 secured to the lower component 16 of the water reservoir 12. The opposite second end 32 of the elbow 28 is left open, to provide a water outlet for the reservoir 12. It will be noted that due to the partial vacuum formed in the upper end of the water reservoir 12 due to the seal 24 used at the top, that water will not flow to the outlet end 32 of the elbow 28 unless the partial vacuum is relieved in some manner. Accordingly, a breather tube 34 is provided between the two ends 30 and 32 of the elbow 28. When the water level at the outlet end 32 drops to the level of the breather tube 34, air enters the tube 34 and rises to the upper end of the water reservoir 12, where it relieves the partial vacuum therein. This allows the water level within the reservoir 12 to drop slightly, thus raising the water level in the outlet end 32 of the elbow 28 to cover the air inlet end of the breather tube 34. This assembly serves to automatically assure a constant water level at the outlet end 32 of the elbow 28 of the water reservoir 12.

The elbow 28 used to support the water reservoir 12 and to provide an outlet 32 therefor, is also used as an attachment for supporting the upper structure of the present automatic bird feeder and waterer 10. A conventional elbow trap, e. g., the elbow trap 28, is provided with a drain fitting 36 and mating closure cap 38 at the lowermost portion thereof, midway between the two ends 30 and 32. The cap 38 fits into a larger adapter 40, which is used to mate the smaller diameter drain fitting 36 of the elbow 28 to a larger diameter support structure, discussed below. The cap 38 is concentrically drilled and a bolt 42 is installed through the hole in the cap 38 and the adapter 40, with one or more large diameter washers 44 being installed beneath the mating nut 46 to provide a clamping action between the nut 46 and head of the bolt 42 to hold the components 38 and 40 together. The assembly comprising components 38 through 46 need not be liquid tight, as the head of the bolt 42 bears against a stopper 48 positioned in the drain fitting 36 of the elbow 28, to seal the water therein when the assembly is tightened.

A support column or tube 50 is provided to attach to and support the water tube assembly 12. The column 50 is preferably a relatively large diameter, to provide sufficient strength for the support of the structure. Accordingly, a suitable diameter series of telescoping tubes or sleeves, respectively 52 and 54, may be used for connecting the lower coupling component 56 to the support column 50. The smaller sleeve 52 fits closely within the lower end of the lower coupling component 56, with an intermediate diameter sleeve 54 installed thereto. Finally, the support column 50 is assembled to the intermediate tube 54 to complete the assembly. Alternatively, other attachment means may be used as desired.

It will be seen that the various components may be permanently affixed to one another as desired. However, some means of providing for rotational adjustment of the upper structure is preferred. This may be accomplished by loosening the two threaded coupling portions 56 and 58, and rotating the flanged fitting 40 (and water reservoir structure 12 attached thereto) to the desired position, then tightening the coupling components 56 and 58 to secure the assembly 12 in the desired orientation. Alternatively, other components may be left unsealed from one another, to allow relative rotation therebetween. The two threaded coupling portions 56 and 58 also allow the assembly to be disassembled for compact storage or transport of the feeder and waterer 10 when required.

The support column 50 may be formed of PVC plastic pipe or tube, metal pipe, or other suitable structural material as desired. The lower end of the column 50 may be imbedded in a massive support base 60 (concrete, etc.) in order to provide support for the generally vertically oriented feeder and waterer 10 extending upwardly therefrom. The support base 60 may be set into a decorative base enclosure 62 (flower pot, etc.) if so desired, to provide an attractive setting for the feeder and waterer 10.

The food reservoir assembly 64 is essentially formed of a cylindrical section of transparent (or at least translucent) plastic material 66, such as acrylic (e. g. , Plexiglas, tm), in order to see the quantity of food remaining therein. The food reservoir cylinder or tube 66 is a larger diameter than that used for the water reservoir portion 12, and is installed concentrically about the water reservoir 12 with the water reservoir 12 residing within the food reservoir 64.

The lower end of the tube 66 includes a closure 68 having a central opening 70 therethrough, through which the lower tube 16 of the concentric water reservoir 12 passes. A series of food dispensing openings 72 are provided in the sides of the bottom food reservoir cap 68. The lower end of the food reservoir tube 66 includes a plurality of downwardly extending tabs 74, which abut the inner surface of the floor of the lower cap or closure 68 and define a like number of food dispensing slots 76 therebetween. The lower cap or closure 68 is affixed (glued, screwed, riveted, etc.) to the bottom end of the tube 66, with the food dispensing openings 72 aligned with the slots 76 of the bottom end of the food reservoir tube 66. This allows seed or other food to flow through the slots 76 at the base of the tube 66, and through the dispenser openings 72 of the lower closure 68.

Each of the food dispensing openings 72 includes a tray 78 adjacent thereto, secured to the bottom cap or closure 68 of the assembly by suitable means (adhesive, screws 80, etc.). Each tray 78 may be formed of a section of PVC (or other material) cap or closure, as in the bottom end closure 68 for the food reservoir 64. Each tray 78 comprises a floor 82 and partially surrounding wall 84, with a portion of the wall removed to provide an opening 86 communicating with the corresponding adjacent food dispensing opening 72 of the bottom closure 68 for the food reservoir tube 66. Thus, seed or other food flows downwardly through the food reservoir 64, surrounding the concentrically disposed water reservoir assembly 12 therein, to flow outwardly through the gaps 76 in the bottom of the food reservoir tube 66, through the openings 72 in the bottom closure 68 for the food reservoir 64, and thence into the trays 78, where it is accessible to birds.

As with most bird feeders, it has been found that non-flying animals which are capable of climbing, particularly squirrels, can gain access to the feed trays 78 unless some additional measures are taken to preclude their access to the feed or seed in the trays 78. Accordingly, the present automated feeder and waterer 10 includes a guard 88 installed over each of the feed trays 78. The guards 88 are formed of relatively small diameter 90 degree elbows, with the diameter being sufficient to allow the head of a bird to pass therein to access the seed in the trays 78. However, the diameter is sufficiently small that the head of a larger animal, such as a squirrel, cannot fit into the elbows and thus cannot access the seed in the trays 78. Each elbow includes a cutout 90 in the rear portion thereof, which communicates with the tray openings 86 and corresponding food dispensing openings 72 of the lower end cap 68 of the food reservoir assembly 64 to allow feed or seed to flow from the reservoir assembly 64 outwardly to the trays 78 for access by birds. A perch 92 is provided for each tray 78, since the guards 88 preclude perching upon the edges of the trays.

A generally circular, downwardly and outwardly sloping roof or shade 94 is secured about the central area of the food reservoir 64, thus protecting the food trays 78 thereunder from the elements (rain, snow, etc.). The roof or shade 94 is preferably sealed in place by an upper and a lower ring, respectively 96 and 98, installed about the circumference of the food reservoir tube 66 and immediately above and below the roof or shade 94. The sealing of at least the upper ring 96 to the tube 66, and to the inner circumference of the roof or shade 94, precludes rainwater runoff from flowing down the outside of the tube 66 and into any gaps between the bottom end of the tube 66 and lower end cap 68, trays 78, and/or guards 88.

The upper end of the food reservoir tube 66 includes a food replenishing passage 100 formed through the wall thereof. (The lower edge of the passage 100 is beveled outwardly, to preclude rain or moisture from entering the food reservoir tube 66.) The passage 100 has a stop block 102 at each lateral edge thereof, which engage the screw mechanisms of the two hose clamps 20 of the water reservoir assembly 12. The abutting contact of the screw mechanisms of each hose clamp 20 against the corresponding stop 102 precludes relative rotation of the food reservoir assembly 64 about the water reservoir assembly 12, thus maintaining the positions of the food trays 78 away from the water outlet 32 of the lower elbow 28 of the water reservoir assembly 12.

A rotatable sleeve 104 is installed about the upper end of the food reservoir tube 66, with the sleeve 104 having a food replenishing passage 106 therethrough. (The rotating sleeve 104 is turned so the passage 106 is facing away from the orientation of view of FIG. 1.) The base of the sleeve 104 is provided with a series of drainage slots 108, with a fixed stop ring 110 sealed to the outer circumference of the tube 66 immediately below the rotating sleeve 104. Thus, water which may seep between the sleeve 104 and underlying portion of the food reservoir tube 66, passes through the drain slots 108 of the rotating sleeve 104 and runs down the outside of the sealing ring 110, precluding water buildup between the sleeve 104 and upper end of the food reservoir tube 66 and thus into the food tube opening 100, thereby serving to keep dry the seed or other food within the food reservoir tube 66.

The open upper end of the food reservoir assembly 64 is capped with a reducer fitting 112 having a slightly larger major diameter than the diameter of the upper end of the reservoir tube 66, and fitting over the upper end of the tube 66. The smaller diameter of the upper end of the reducer 112 fits closely about the upper tube 14 of the water reservoir assembly 12 to secure it concentrically within the food reservoir 64, with the water reservoir reducer 22 fitting immediately over the upper end of the food reservoir reducer 112 to preclude entry of rain water, etc. therein. The upper edge of the rotating sleeve 104 may be beveled outwardly, if so desired, to preclude runoff from the food reservoir reducer end 112 from entering the food reservoir tube 66.

Similarly, the upper edge of the food reservoir reducer 112 may also be beveled outwardly, in order to preclude runoff from the upper water reservoir reducer 22 flowing between the larger reducer 112 and the outer surface of the upper portion 14 of the water reservoir 12 and thence into the interior of the food reservoir assembly 64. A stop ring 114 may be provided about the upper end of the upper water reservoir tube 14, if desired, to provide a seat for the larger reducer 112. This maintains a close fit between the upper end of the larger reducer 112 and the adjacent smaller reducer 22 of the upper end of the water reservoir assembly 12, as the various components are tightened together during assembly.

To replenish the food supply in the food reservoir tube 66, the sleeve 104 at the upper end thereof is rotated so that its opening 106 is aligned with the opening or passage 100 formed through the wall of the upper end of the food reservoir 66, and food (seed, etc.) is poured into the food reservoir 66. The quantity of food within the reservoir 66 is easily checked at any time, by means of its transparent or translucent configuration.

When the food reservoir 66 has been refilled, the sleeve 104 is rotated to position its opening 106 away from the opening 100 formed through the upper wall of the food reservoir tube 66 (generally as shown in FIG. 1), to essentially seal the food reservoir tube 66. The food supply is automatically distributed to the feeder trays 78 at the bottom end of the reservoir tube 66, by flowing through the gaps or openings 76 in the bottom of the tube 66 and the openings 72 of the lower end cap 68, and thence to the trays 78 for consumption by birds. Consumption of the food automatically allows more food to flow to the trays 78, in the manner described above.

The water reservoir assembly 12 is replenished just as easily, by removing the upper cap 26 and the underlying stopper 24 (if any), and filling the reservoir assembly 12 with water. (As the opening of the upper cap 26 releases the partial vacuum within the reservoir 12, the normally open end 32 of the elbow 28 must be temporarily capped during the filling operation.) The stopper 24 and cap 26 may then be replaced to provide an air tight seal for the upper end of the reservoir assembly 12 and the temporary closure at the outlet end 32 is removed, thus allowing the breather tube 34 across the elbow 28 to regulate the water supply automatically without outside intervention.

In summary, the present automatic bird feeder and waterer 10 will serve as a most desirable accessory for most homeowners, and will serve to attract and care for birds at virtually all seasons of the year in most areas of the nation. The large food and water reservoirs 66 and 12 provided by the present feeder and waterer 10, provide food and water for days, if not weeks, for the typical bird population of most areas. Yet, both the food and water reservoirs 66 and 12 are easily refilled or replenished when required.

The numerous conventional components of which the feeder and waterer 10 is constructed, provide for ease of repair and maintenance of the device, as well as long life and economy of operation. The present feeder and waterer 10 may be easily disassembled for transport to another area or home, if so desired. The water outlet end 32 of the device may be capped with a stopper or other appropriate closure (not shown) if desired, for transport of the assembly 10 or to preclude the entry of water into the water reservoir 12 after it has been drained for the winter, to preclude ice formation therein. The present bird feeder and waterer 10 is easily readied for use in the spring, or assembled for use in a new location, essentially as described herein. Accordingly, the present automatic bird feeder and waterer 10 will provide persons with many hours of enjoyable entertainment, watching birds which are attracted to the feeder and waterer 10 as they enjoy the food and water provided.

It is to be understood that the present invention is not limited to the sole embodiment described above, but encompasses any and all embodiments within the scope of the following claims.

I claim:

1. An automatic bird feeder and waterer, comprising:
   a generally vertical, elongate water reservoir having a lower water outlet;
   a generally vertical, elongate food reservoir, having at least one lower food outlet; and
   said food reservoir concentrically surrounding said water reservoir;
   said water outlet and said food outlet are in different locations such that they can be used simultaneously.

2. The automatic bird feeder and waterer according to claim 1, wherein:
   said lower water outlet of said water reservoir comprises a 180 degree elbow having an inlet end and an outlet end.

3. The automatic bird feeder and waterer according to claim 2, including:
   support means extending downwardly from said elbow, and;
   said support means comprising a generally vertical rigid support column having a lower end anchored in a weighted decorative base.

4. The automatic bird feeder and waterer according to claim 2, including:
   a breather tube extending between and communicating with said inlet end and said outlet end of said elbow, for maintaining a constant water level in said outlet end of said elbow.

5. The automatic bird feeder and waterer according to claim 1, including:

guard means disposed over each said lower food outlet of said food reservoir, for limiting access by non-flying animals to food disposed therein.

6. The automatic bird feeder and waterer according to claim 1, wherein:

said water reservoir and said food reservoir are formed of plastic pipe.

7. The automatic bird feeder and waterer according to claim 1, wherein:

said water reservoir is formed of polyvinyl chloride pipe and;

said food reservoir is formed of a combination of polyvinyl chloride pipe components and clear acrylic material for viewing contents of said food reservoir.

8. An automatic bird feeder and waterer, comprising:

a generally vertical, elongate water reservoir having a lower water outlet;

a generally vertical, elongate food reservoir, having at least on e lower food outlet; and at least said water reservoir and said food reservoir being formed of mating components of tubular pipe material.

9. The automatic bird feeder and waterer according to claim 8, wherein:

said lower water outlet of said water reservoir comprises a 180 degree elbow having an inlet end and an outlet end.

10. The automatic bird feeder and waterer according to claim 9, including:

support means extending downwardly from said elbow, and;

said support means comprising a generally vertical rigid support column having a lower end anchored in a weighted decorative base.

11. The automatic bird feeder and waterer according to claim 9, including:

a breather tube extending between and communicating with said inlet end and said outlet end of said elbow, for maintaining a constant water level in said outlet end of said elbow.

12. The automatic bird feeder and waterer according to claim 8, including:

guard means disposed over each said lower food outlet of said food reservoir, for limiting access by non-flying animals to food disposed therein.

13. The automatic bird feeder and waterer according to claim 8, wherein:

said water reservoir and said food reservoir are formed of plastic pipe.

14. The automatic bird feeder and waterer according to claim 8, wherein:

said water reservoir is formed of polyvinyl chloride pipe, and;

said food reservoir is formed of a combination of polyvinyl chloride pipe components and clear acrylic material for viewing contents of said food reservoir.

15. An automatic bird feeder and waterer, comprising:

a generally vertical, elongate water reservoir having a lower end with a water outlet;

a generally vertical, elongate food reservoir, having at least one lower food outlet; and a rigid support column extending downwardly from said lower end of said water reservoir;

said water outlet and said food outlet are in different locations such that they can be used simultaneously.

16. The automatic bird feeder and waterer according to claim 15, wherein:

said support column includes a lower end anchored in a weighted decorative base.

17. The automatic bird feeder and waterer according to claim 15, wherein:

said lower end of said water reservoir comprises a 180 degree elbow having an inlet end and an outlet end.

18. The automatic bird feeder and waterer according to claim 17, including:

a breather tube extending between and communicating with said inlet end and said outlet end of said elbow, for maintaining a constant water level in said outlet end of said elbow.

19. The automatic bird feeder and waterer according to claim 15, including:

guard means disposed over each said lower food outlet of said food reservoir, for limiting access by non-flying animals to food disposed therein.

20. The automatic bird feeder and waterer according to claim 15, wherein:

said water reservoir is formed of opaque plastic pipe, and;

said food reservoir is formed of a combination of opaque plastic pipe components and clear plastic material for viewing contents of said food reservoir.

* * * * *